United States Patent
England et al.

(10) Patent No.: US 10,346,038 B2
(45) Date of Patent: Jul. 9, 2019

(54) BRAILLE DATA ENTRY USING CONTINUOUS CONTACT VIRTUAL KEYBOARD

(71) Applicant: International Business Machines Corporation, Armonk, NY (US)

(72) Inventors: Laurence E. England, Morgan Hill, CA (US); Bruce J. U. Macisaac, San Jose, CA (US); Rosanna S. Mannan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 14/945,956

(22) Filed: Nov. 19, 2015

(65) Prior Publication Data
US 2017/0147200 A1    May 25, 2017

(51) Int. Cl.
*G06F 3/01*     (2006.01)
*G09B 21/00*    (2006.01)
*G06F 3/0488*   (2013.01)

(52) U.S. Cl.
CPC ....... *G06F 3/04886* (2013.01); *G09B 21/002* (2013.01); *G06F 3/016* (2013.01); *G06F 2203/014* (2013.01); *G06F 2203/04808* (2013.01); *G06F 2203/04809* (2013.01)

(58) Field of Classification Search
CPC ............... G06F 3/04886; G06F 3/0416; G06F 2203/04808; G09B 21/002
See application file for complete search history.

(56) References Cited

U.S. PATENT DOCUMENTS

| 8,830,185 | B2 | 9/2014 | Ryu et al. |
| 2010/0265200 | A1 | 10/2010 | Cho |
| 2012/0162083 | A1* | 6/2012 | Zhu ..................... G06F 3/04886 345/168 |
| 2012/0254804 | A1* | 10/2012 | Sheha .................... G06Q 30/02 715/834 |
| 2013/0249821 | A1* | 9/2013 | Dharmaraja .......... G06F 3/0219 345/173 |

(Continued)

FOREIGN PATENT DOCUMENTS

| CN | 103049082 A | 4/2013 |
| WO | 20120134210 A2 | 10/2012 |

OTHER PUBLICATIONS

Jordan, "Circular direct-selection interface for non-visual use", Mar. 18, 2015, IP.com, All pages.*

(Continued)

*Primary Examiner* — Kieu D Vu
*Assistant Examiner* — Roberto Borja
(74) *Attorney, Agent, or Firm* — Garg Law Firm, PLLC; Rakesh Garg; Richard Wilhelm (57) ABSTRACT

A first touch gesture is sensed at a subset of a set of six Braille dot touch points at a virtual Braille keyboard. The first touch gesture corresponds to a Braille character. A second touch gesture is sensed that concurrently touches each of the six Braille dot touch points in the set of Braille dot touch points. A contact with a layout of the virtual Braille keyboard with at least one Braille dot touch point is continuously maintained while transitioning from the first touch gesture to the second touch gesture. In response to the second touch gesture, the Braille character is accepted.

11 Claims, 6 Drawing Sheets

(56) References Cited

U.S. PATENT DOCUMENTS

| | | | | |
|---|---|---|---|---|
| 2013/0275907 A1* | 10/2013 | Lau | G06F 3/04886 | 715/773 |
| 2014/0192003 A1* | 7/2014 | Kim | G06F 3/041 | 345/173 |
| 2015/0074660 A1* | 3/2015 | Sheng | G06F 8/61 | 717/178 |
| 2015/0088955 A1* | 3/2015 | Hendrick | G06Q 30/02 | 709/201 |
| 2015/0234926 A1* | 8/2015 | Endou | G06F 17/30867 | 707/725 |
| 2015/0302774 A1* | 10/2015 | Dagar | G06F 3/04886 | 345/173 |

OTHER PUBLICATIONS

Document AA, Burton, D., "Can Android Make your Mobile Phone Accessible", AFB AccessWorld Magazine, vol. 11, No. 2, May 2010, published by the American Foundation for the Blind (AFB).

Samsung; Multi-Touch in Samsung Devices, http://developer.samsung.com/java/technical-docs/Multi-Touch-in-Samsung-Devices, published Jul. 29, 2010.

Wikipedia, Braille, http://en.wikipedia.org/wiki/Braille, Nov. 8, 2015.

Freedom Scientific, Blindness Solutions: Focus 40 Blue, http://www.freedomscientific.com/Products/Blindness/Focus40BrailleDisplay, 2015.

BrailleTouch, http://www.cc.gatech.edu/~mromero/brailletouch, 2012.

Wikipedia, Multi-touch, http://en.wikipedia.org/wiki/Multi-touch, 2015.

Samsung Developers, Multi-Touch in Samsung Devices, http://developer.samsung.com/java/technical-docs/Multi-Touch-in-Samsung-Devices, 2015.

Youtube, Samsung Galaxy S3 MultiTouch Test, https://www.youtube.com/watch?v=sf1RR3xrB-U, Sep 8, 2012.

Southern et al; An Evaluation of BrailleTouch: Mobile Touchscreen Text Entry for the Visually Impaired, MobileHCI'12, Sep. 21-24, 2012, 317-326, San Francisco, CA, USA.

* cited by examiner

BRAILLE DATA ENTRY USING CONTINUOUS CONTACT VIRTUAL KEYBOARD

TECHNICAL FIELD

The present invention relates generally to a method, system, and computer program product for making touch-sensitive devices accessible to visually impaired users. More particularly, the present invention relates to a method, system, and computer program product for Braille data entry using continuous contact virtual keyboard.

BACKGROUND

Braille is a tactile method used by the blind and visually impaired users for writing and reading text. A standard set of dot patterns using six dot positions defines the Braille alphabet. A keyboard implementing the six dot positions to represent Braille characters is called a Perkins Brailler Keyboard.

Many touchscreen devices are proliferating the daily lives of users with and without disabilities alike. A touchscreen device is a device that accepts a user interaction, such as an input from the user, via a touch gesture. A touch gesture comprises a touching of the touch-sensitive component, usually a touch-sensitive screen, by a user. Typically, the user touches the touchscreen using one or more fingers, a stylus, or another object.

A variety of touch gestures are presently recognized and used with touchscreens. A single-touch gesture is formed when the user touches a single point or area on the touchscreen. A multi-touch gesture is formed when the user simultaneously touches more than one point or area on the touchscreen.

Some touch-based devices and applications recognize a touch gesture when the user makes contact with the touchscreen. Other touch-based devices and applications recognize a touch gesture when the user has removed the contacting finger or object after making contact with the touchscreen.

A virtual Braille keyboard is a visible or invisible presentation of a set of areas on a touchscreen. Each area in the set of areas is defined as a Braille key. Six of the areas in the set of areas represent the standard six dot positions used in the Braille standard. One or more other areas in the set of areas represent other functions, such as back-space, line-space, or the blank-space characters. Different manufacturers of virtual Braille keyboards use different layouts of the set of areas, and may add or remove additional areas besides the six areas corresponding to the standard six Braille dot positions.

SUMMARY

The illustrative embodiments provide a method, system, and computer program product. An embodiment includes a method that senses a first touch gesture at a subset of a set of six Braille dot touch points at a virtual Braille keyboard. The first touch gesture corresponds to a Braille character. The embodiment senses a second touch gesture that concurrently touches each of the six Braille dot touch points in the set of Braille dot touch points, wherein a contact relative to a layout of the virtual Braille keyboard with at least one Braille dot touch point is continuously maintained while transitioning from the first touch gesture to the second touch gesture. The embodiment accepts, responsive to the second touch gesture, the Braille character.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A touchscreen is described and used only as an example touch-sensitive component and not to imply any limitation thereto. Other touch-sensitive components, such as a surface of a device other than the screen where the device can sense a touch gesture are contemplated within the scope of the illustrative embodiments.

A virtual Braille keyboard can take different forms on a touchscreen. Such different forms, such as different arrangements or numbers of touch areas configured for receiving Braille input, are contemplated within the scope of the illustrative embodiments.

A visually impaired user has to position several fingers in the designated touch areas of a virtual Braille keyboard to form a Braille character. For example, a visually impaired user needs a certain amount of time to form and position a multi-touch correctly on a virtual Braille keyboard to input an intended Braille character. It is not uncommon to form an incorrect multi-touch gesture, such as touching an area that represents an incorrect Braille dot position for a letter. It is also not uncommon to incorrectly position the multi-touch gesture, such as by touching outside a defined area for an intended dot position. Some virtual Braille keyboards provide audible feedback to the user about where their touches are positioned in a multi-touch gesture, what letter is formed by the multi-touch, and the like.

The illustrative embodiments recognize that the presently-available virtual keyboards are limiting or undesirable for several reasons. The above-described difficulties and other similar difficulties in providing Braille inputs make recognizing Braille input a tricky process. Presently, virtual Braille keyboards allow the user to make, change, or move the multi-touch gesture until the user is satisfied with the gesture, then require the user to remove all the touch points, to wit, remove all the touches in the multi-touch gesture, to register the input character. The removal of all touch points has to be accomplished by the user by removing all contacting fingers or objects from the Braille dot touch areas on the touchscreen.

When the user is ready to input the next character, the user again makes, changes, or moves the next multi-touch gesture until the user is satisfied with the gesture, then removes all the touch points of the multi-touch gesture to register the next input character. Each Braille character has to be input by repeating this entire cycle.

The illustrative embodiments recognize that this existing process for Braille input using virtual Braille keyboards is slow, tedious, and computationally expensive. For example, the repeated removal of all touch points limits the speed at which even a proficient Braille user can input Braille characters.

As another example, each time the user removes all touch points, the user loses the relative positioning of the users fingers and the touch areas of the virtual Braille keyboard. In other words, when a visually impaired person loses all contact with the touchscreen after one multi-touch gesture, and regains contact in the next multi-touch gesture, the lack of visual clues causes the user's placement of the touch gesture to land at different locations on the touchscreen. Consequently, when the user gestures to input the next character, the virtual Braille keyboard application has to recalibrate the virtual Braille keyboard's position such that the touch areas of the virtual Braille keyboard realign with the location of the multi-touch gesture on the touchscreen, which is different from a previous location, even if the same character is input again using the same multi-touch gesture. The recalibration consumes computing resources, which are limited in many touchscreen devices, and must be consumed judiciously.

Because the touches of a multi-touch gesture often land at different locations on the touchscreen, interpreting the initial touch as a Braille character leads to an unacceptable degree of incorrect inputs or erroneous recognition of the characters. Therefore, most virtual Braille keyboards avoid using the act of touching as the input, and use the removal of the touch instead as the input.

The illustrative embodiments used to describe the invention generally address and solve the above-described problems and other problems related to virtual Braille keyboards.

An embodiment allows a user to maintain contact with the touchscreen between different multi-touch gestures for different Braille characters. For example, the embodiment recognizes one multi-touch gesture as one Braille character input, but does not require that the user release all touch points or remove all touches from the touchscreen to register the input.

The embodiment recognizes a "home" touch on a virtual Braille keyboard according to the embodiment. When the user is satisfied with the formation and position of a multi-touch gesture, the user performs a home touch by touching all Braille dot touch areas of the virtual braille keyboard. The home touch causes the embodiment to register the Braille character input that corresponds to the multi-touch.

For example, the letter A is formed by touching only the first of the six Braille dots. To input letter A according to an embodiment, the user begins by touching the first dot with the left index finger while keeping the other five Braille dots untouched. When the user is satisfied with forming the letter A, the user touches all six Braille dot touch areas—e.g., using the index, middle, and ring fingers of the left and right hands—to form the home touch. Upon detecting the single dot touch followed by the home touch, the embodiment registers the letter A. Because the user transitions from a multi-touch gesture of a Braille character to the home touch, the user maintains continuity of contact with the touchscreen.

Due to the continuity of the contact with the touchscreen, the user does not lose the reference to relative positioning of the virtual Braille keyboard relative to the user's fingers or objects. Avoiding the loss of relative positioning of the virtual Braille keyboard through the continuity of contact with the touchscreen improves the accuracy of the subsequent multi-touch gesture as compared to the accuracy when the user has to release all touch points as in the presently used methods. Because the subsequent multi-touch gestures have an improved accuracy and the unchanged positioning of the virtual Braille keyboard relative to the user's fingers or objects, the virtual Braille keyboard need not be recalibrated at each character, or at least as frequently, for realignment with the user's fingers or objects as in the presently used methods.

The user can continue to input character after character in Braille by using a home touch to register each character input. Once the user has finished providing the Braille input, the user removes all touches from all Braille dot touch areas and ends the continuity of touch. An embodiment registers an end of the input process when the embodiment detects that the no touch is present at any of the Braille dot touch areas.

These examples of maintaining a continuity of contact with the touchscreen are not intended to be limiting. From this disclosure, those of ordinary skill in the art will be able to conceive many other ways of registering the input by performing the home touch with continuity of touchscreen contact, and the same are contemplated within the scope of the illustrative embodiments.

A method of an embodiment described herein, when implemented to execute on a device or data processing system, comprises substantial advancement of the functionality of that device or data processing system for Braille data entry using continuous contact virtual keyboard. For example, prior-art virtual Braille keyboards require a removal of all touch in order to register a Braille character. An embodiment allows the user to maintain contact with the virtual Braille keyboard of the embodiment, and registers the Braille character using a home touch at all Braille dot touch areas of the virtual Braille keyboard. An embodiment does not require the release of all touch points to register each character but only to end the Braille input process. Such manner of Braille data entry using continuous contact virtual keyboard is unavailable in presently available devices or data processing systems. Thus, a substantial advancement of such devices or data processing systems by executing a method of an embodiment is in increasing the accuracy of Braille inputs, increasing a speed of inputting Braille characters using a virtual Braille keyboard, and reduces the computing cost of using a virtual Braille keyboard for entering Braille characters.

The illustrative embodiments are described with respect to certain gestures, fingers or objects, touch-sensitive components, virtual Braille keyboard layouts, touch areas on virtual Braille keyboards, Braille standard, manners of maintaining continuity of contact, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
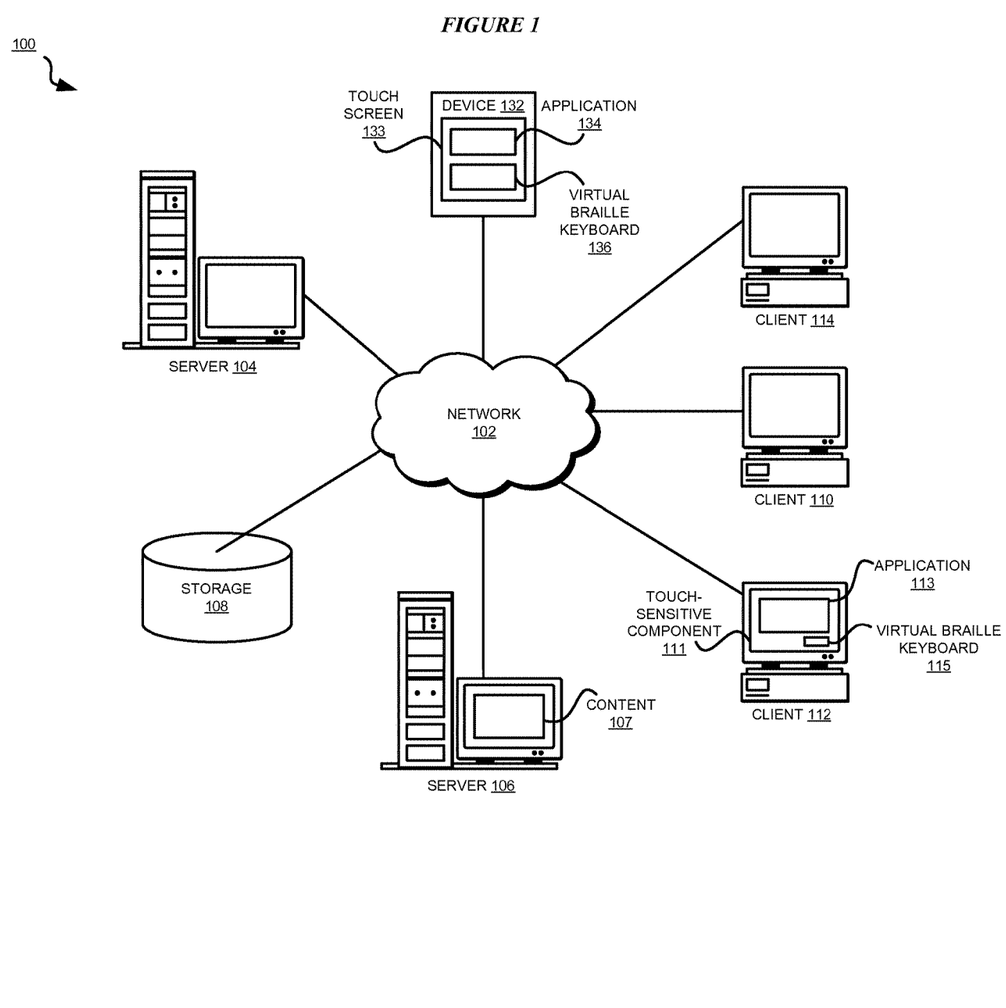
FIG. 1 depicts a block diagram of a network of data processing systems in which illustrative embodiments may be implemented.
Figure 2:
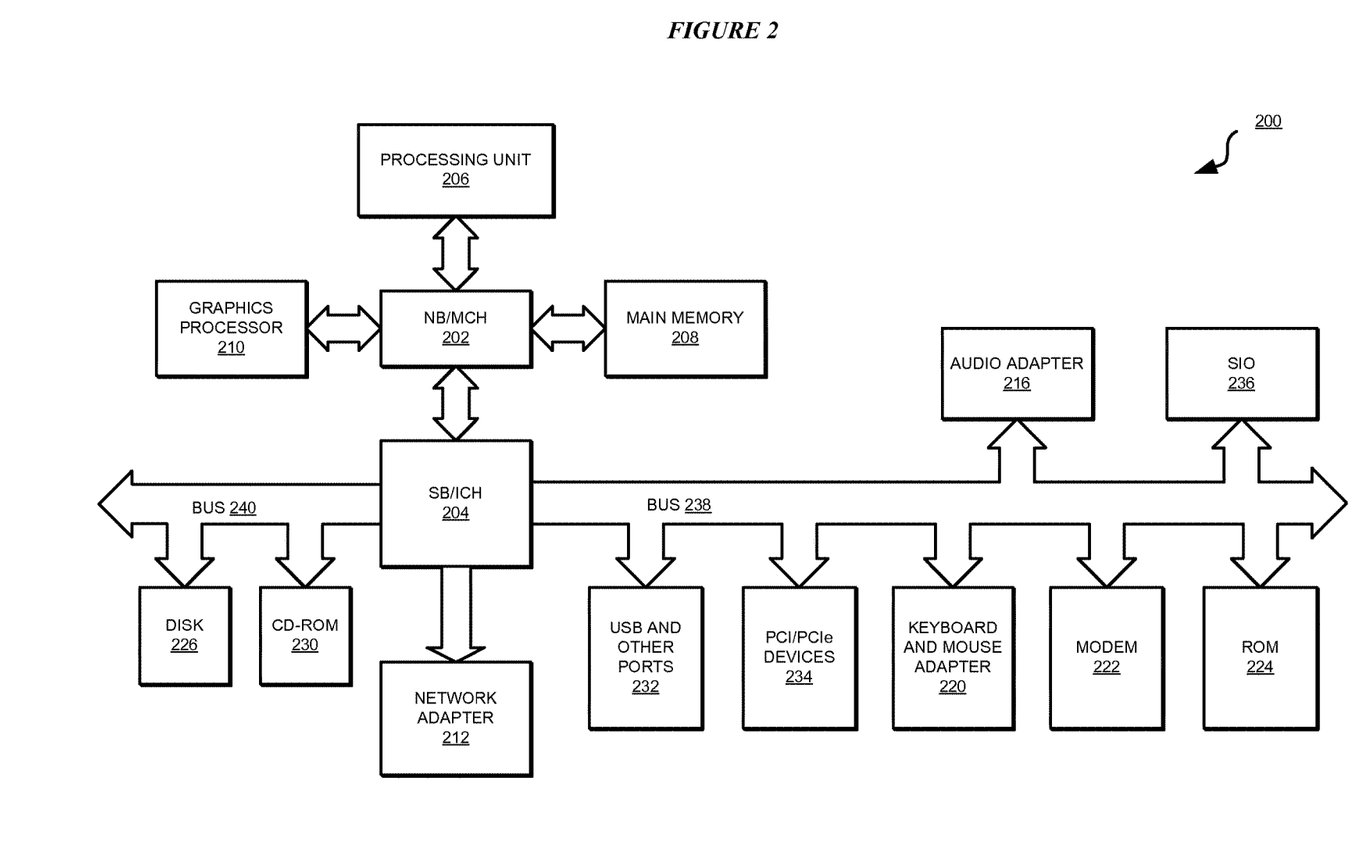
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 134 implements an embodiment described herein in device 132. As a non-limiting example, device 132 uses touchscreen 133 to receive touch gestures based inputs, such as from virtual Braille keyboard 136 presented on touchscreen 133. Similarly, application 113 implements an embodiment described herein in client 112. As a non-limiting example, client 112 uses touch-sensitive component 111 to receive touch gestures based inputs, such as from virtual Braille keyboard 115 presented on touch-sensitive component 111. The touch gestures provided at virtual Braille keyboard 136 may manipulate device 132, another application executing in device 132, content 107 served from server 106, or some combination thereof. The touch gestures provided at virtual Braille keyboard 113 operate in a similar manner at client 112.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105 and 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
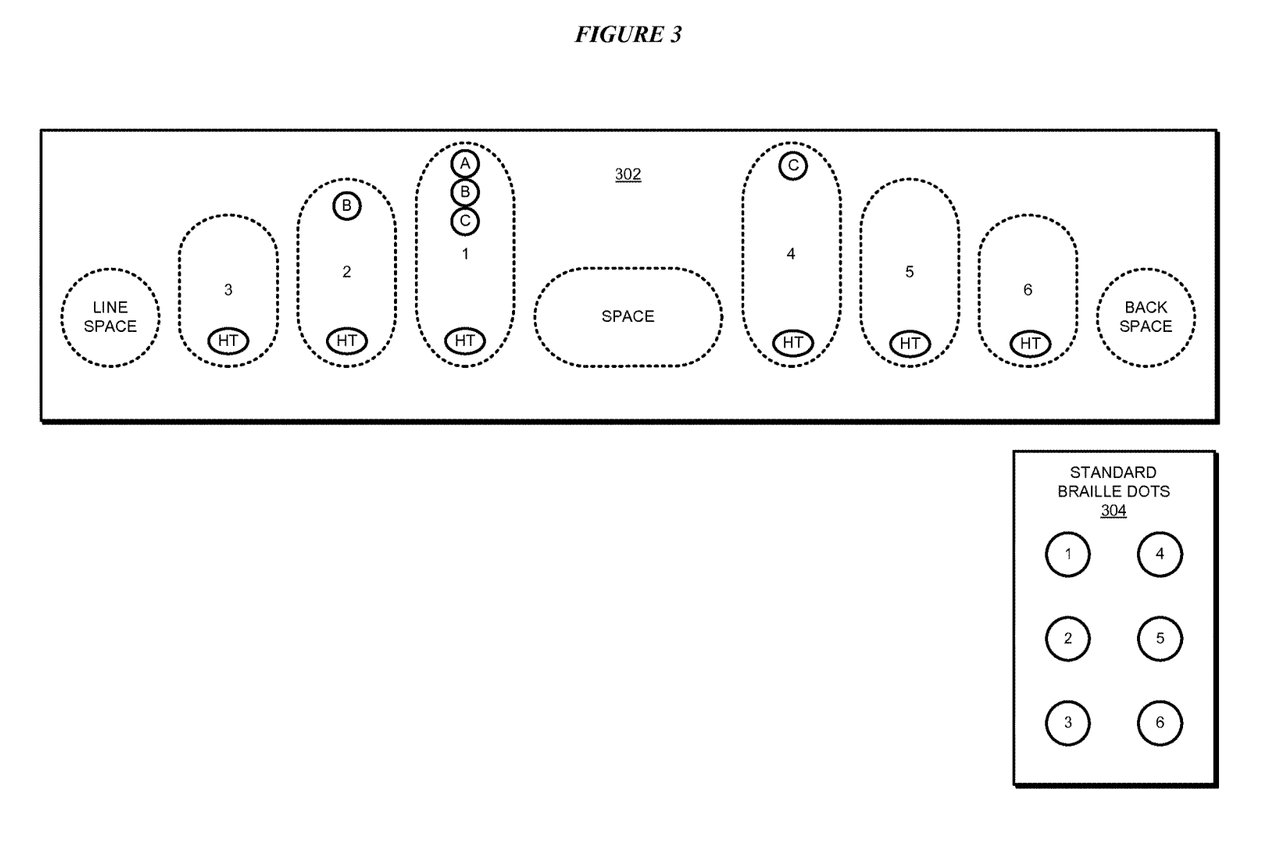
FIG. 3 depicts a block diagram of an example configuration of a virtual Braille keyboard in accordance with an illustrative embodiment.

With reference to FIG. 3, this figure depicts a block diagram of an example configuration of a virtual Braille keyboard in accordance with an illustrative embodiment. Virtual Braille keyboard 302 is an example of virtual Braille keyboard 136 or 115 in FIG. 1, and is operated using application 134 or 113, respectively, in FIG. 1.

Only as a non-limiting example, a set of areas is defined according to an example Braille standard in virtual Braille keyboard 302. For example, areas labeled "3", "2", "1", and "4", "5", "6" correspond to the six standard dot positions used in Braille to represent characters of an alphabet, as shown in Braille legend 304. The numbered dots in Braille legend 304 correspond to the numbered areas of virtual Braille keyboard 302. For example, touching area 1 on virtual Braille keyboard 302 translates to dot position 1 according to legend 304 being used in the Braille character being input.

The depicted numbers, shapes, sizes, orientation, or placements of the touch areas on virtual Braille keyboard 302 are only non-limiting examples. In one implementation, areas labeled "back space", "space", and "line space" are also presented in virtual Braille keyboard 302 to provide functions corresponding to their descriptive labels. A particular implementation of virtual Braille keyboard 302 may include other possible configurations of touch areas without departing the scope of the illustrative embodiments.

To form Braille character inputs, the user touches a combination of areas 1-6. The touched areas represent dots or pips in a six-position Braille matrix, a particular combination of touched areas representing a particular character in Braille. Typically, but without implying any limitation thereto, a visually impaired user touches area 1 with the left index finger, area 2 with the left middle finger, area 3 with the left ring finger, area 4 with the right index finger, area 5 with the right middle finger, and area 6 with the right ring finger. As needed, the left little finger is used to touch the line space area, the right little finger is used to touch the back space area, and either thumb is used to touch the space area, in the depicted example configuration of virtual Braille keyboard 302.

Using virtual Braille keyboard 302, a user inputs character "A" by touching only area 1 as shown. The user inputs character "B" by touching areas 1 and 2, and character "C" by touching areas 1 and 4 as shown. The home touch is performed by touching areas 1, 2, 3, 4, 5, and 6.

Suppose the user wishes to input the string "ABC" using virtual Braille keyboard 302. According to an embodiment, the user touches area 1, followed by a home touch, followed by a touch at areas 1 and 2, followed by a home touch, followed by a touch at areas 1 and 4, followed by a home touch. If the user has finished providing the input, the user removes all touches from areas 1, 2, 3, 4, 5, and 6, and the embodiment recognizes an end of input.

In one embodiment, a home touch can be optional after the last character of the input, and the removal of all touches from areas 1-6 constitutes a recognition of the last entered character as well as an end of input thereafter. In other words, the last character can be registered by performing a home touch or a release of all touches. In another embodiment, the home touch can also optionally include a touch at the "space" area. In other words, the home touch can be performed by touching areas 1-6, or areas 1-6 and one or more other areas that might be available in a given implementation of virtual Braille keyboard 302.

Figure 4:
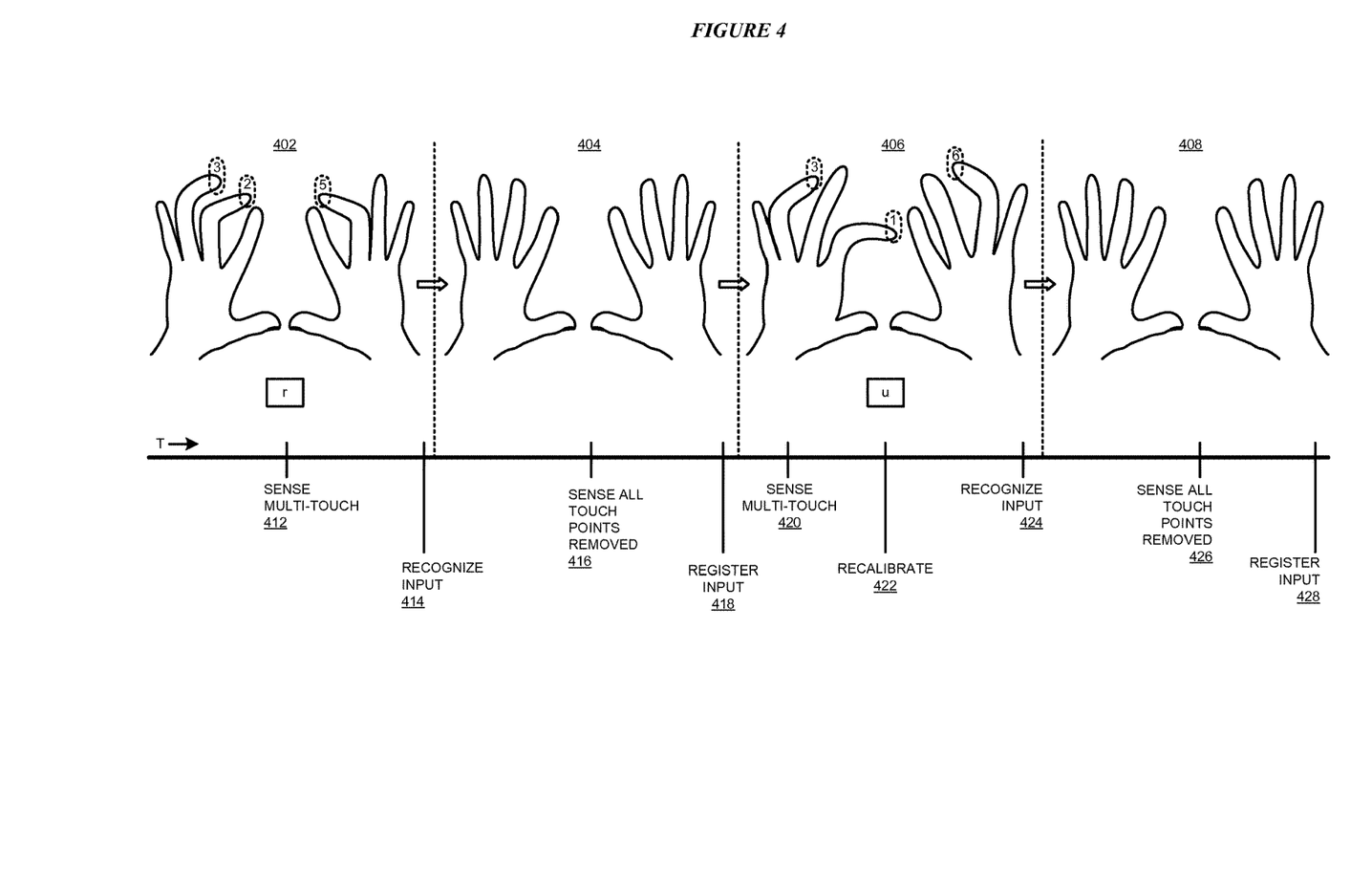
FIG. 4 depicts a timeline series of events that can be improved for capturing Braille inputs in accordance with an illustrative embodiment.

With reference to FIG. 4, this figure depicts a timeline series of events that can be improved for capturing Braille inputs in accordance with an illustrative embodiment. Areas labeled "1", "2", "3", "5", and "6" are the same as the areas with the same labels in FIG. 3.

Finger placement 402 shows a user touching area 3 of a virtual Braille keyboard with the left ring finger, area 2 with the left middle finger, and area 5 with the right middle finger, to form letter "r" in Braille. During the multi-touch gesture represented by finger placement 402, a prior-art virtual Braille keyboard senses the multi-touch gesture at time 412 and recognizes the intended character "r" at time 414.

Existing Braille input methods require a complete release of all touch points. Accordingly, finger placement 404 shows that all touch points have been released, and none of the fingers are contacting the virtual Braille keyboard. During the no contact represented by finger placement 404, a prior-art virtual Braille keyboard senses that all touches have been removed at time 416 and registers the recognized character "r" at time 418.

Finger placement 406 shows a user touching area 3 of the virtual Braille keyboard with the left ring finger, area 1 with the left index finger, and area 6 with the right ring finger, to form letter "u" in Braille. During the multi-touch gesture represented by finger placement 406, a prior-art virtual Braille keyboard senses the multi-touch gesture at time 420. Because of the removal of all touch points in finger placement 404, and repositioning of the touches in finger placement 406, touch area 3 and other touch areas in finger placement 406 are different from touch area 3 and other touch areas in finger placement 402. Accordingly, the prior-art method requires a recalibration of the virtual Braille keyboard at time 422, and recognizes the intended character "u" at time 424.

Again, finger placement 408 shows that all touch points have been released, and none of the fingers are contacting the virtual Braille keyboard. During the no contact represented by finger placement 408, a presently used virtual Braille keyboard senses that all touches have been removed at time 426 and registers the recognized character "u" at time 428.

Figure 5:
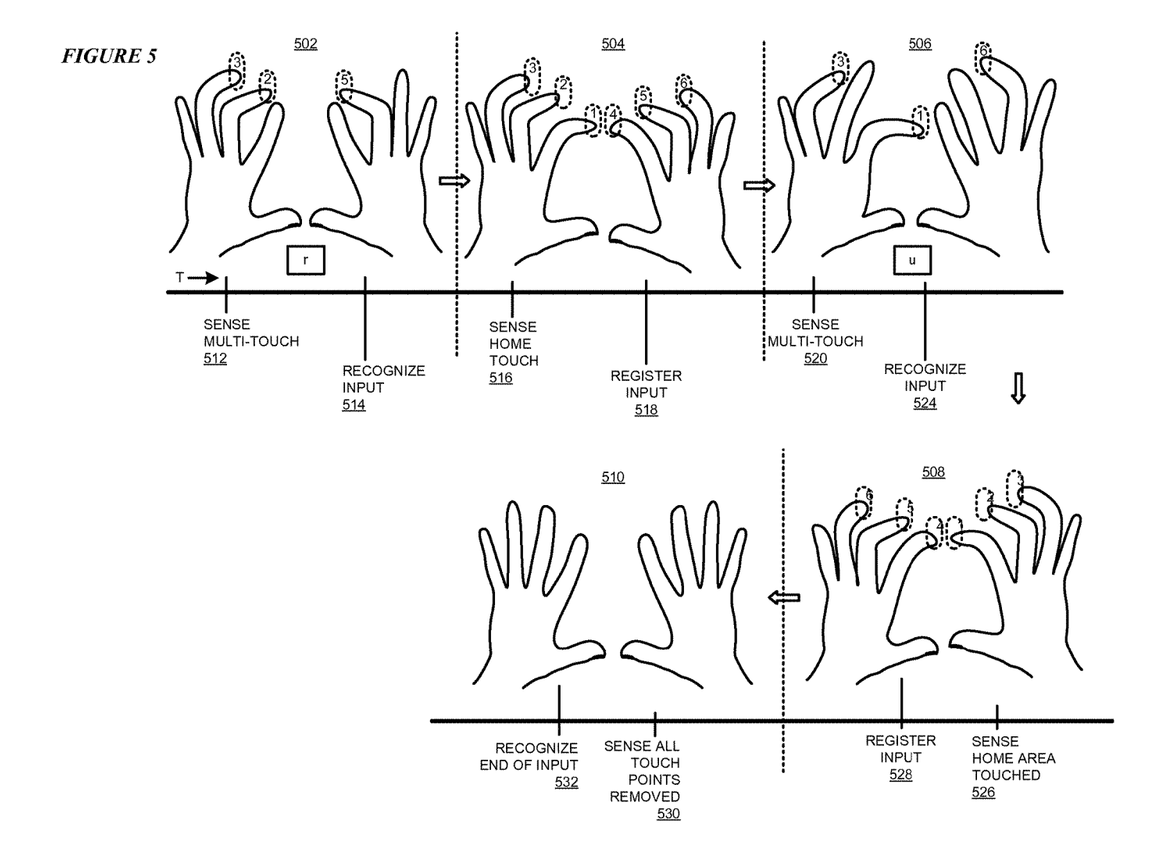
FIG. 5 depicts a timeline series of improved events for capturing Braille inputs in accordance with an illustrative embodiment.

With reference to FIG. 5, this figure depicts a timeline series of improved events for capturing Braille inputs in accordance with an illustrative embodiment. Areas labeled "1", "2", "3", "5", and "6" are the same as the areas with the same labels in FIG. 3.

Finger placement 502, 504, 506, 508, and -510 show a user touching certain areas of an improved virtual Braille keyboard of an embodiment, such as virtual Braille keyboard 136 in FIG. 1. Finger placement 502 shows the user touching area 3 of the improved virtual Braille keyboard with the left ring finger, area 2 with the left middle finger, and area 5 with the right middle finger, to form letter "r" in Braille. During the multi-touch gesture represented by finger placement 502, the improved virtual Braille keyboard senses the multi-touch gesture at time 512 and recognizes the intended character "r" at time 514.

Maintaining a continuity of touch from finger placement 502 to finger placement 504, finger placement 504 shows continued touch or contact at areas 3, 2, and 5, and a touch made at areas 1, 4, and 6 as well—creating a home touch. During the continuity of contact represented by finger placement 504, the improved virtual Braille keyboard senses the home touch at time 516, and registers the recognized character "r" at time 518.

Maintaining a continuity of touch from finger placement 504 to finger placement 506, touches are maintained at some Braille dot touch areas and removed from other Braille dot touch areas. For example, finger placement 506 shows the user maintaining touch at areas 3, 1, and 6 to form letter "u" in Braille. During the multi-touch gesture represented by finger placement 506, the improved virtual Braille keyboard senses the multi-touch gesture at time 520. Because the removal of all touch points is not required, and continuity of contact is maintained, touch area 3 and other touch areas in finger placement 506 are substantially in the same positions the same as touch area 3 and other respective touch areas in finger placement 502. Accordingly, a recalibration of the improved virtual Braille keyboard is avoided, and the improved virtual Braille keyboard recognizes the intended character "u" at time 524.

Maintaining a continuity of touch from finger placement 506 to finger placement 508, finger placement 508 shows continued touch or contact at areas 3, 1, and 6, and a touch made at areas 2, 4, and 5 as well—creating a home touch. During the continuity of contact represented by finger placement 508, the improved virtual Braille keyboard senses the home touch at time 526, and registers the recognized character "u" at time 528.

If "u" is the last input the user wishes to make, finger placement 510 shows all touches removed from areas 1-6. The improved virtual Braille keyboard senses that all touch points have been removed at time 530, and recognizes an end of Braille input at time 532.

As described in this disclosure, a home touch gesture can be made in more than one ways. Optionally, if a home touch is not required to register the last character of an input, finger placement 508 can be omitted and the character "u" can be registered at time 530 or time 532.

Thus, the user can continue imputing various Braille characters while maintaining continuity of contact with the improved virtual Braille keyboard. When a user removes all touch points, such as in finger gesture 510 in FIG. 5, the improved virtual Braille keyboard according to one embodiment recognizes the no contact as an end of input. In other words, the improved virtual Braille keyboard of an embodiment recognizes the releasing of all touch points at Braille dot touch areas as an indication that the user is finished with inputting the data, the process of providing Braille input has come to a completion, and no more Braille input is going to be received for the present activity on the touchscreen.

Different implementations of the improved virtual Braille keyboard may provide additional touch areas other than the six Braille dot touch areas. An embodiment can be adapted to require removal of touches from such other areas to recognize an end of Braille input. Another embodiment can be adapted to ignore any remaining touches in such other areas as long as all touches have been removed from the six Braille dot touch areas to recognize the end of Braille input. Allowing some touches to remain in such other areas may allow continuity of touch even after an end of Braille input, such as when ending input in one data field and moving to begin input at another data field. Such variations are contemplated within the scope of the illustrative embodiments.

Figure 6:
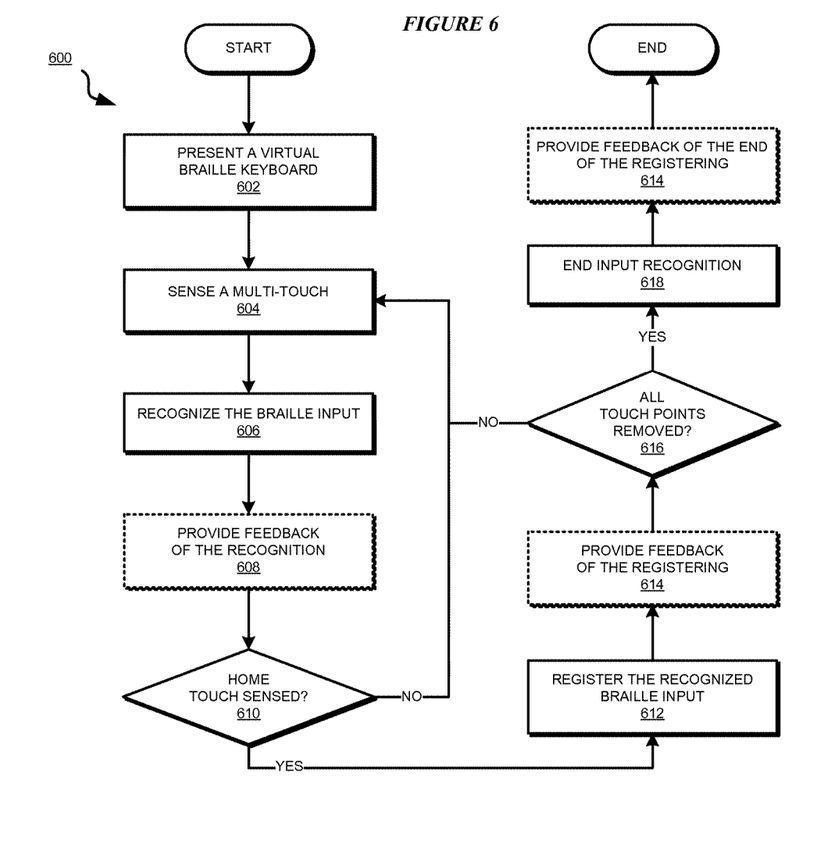
FIG. 6 depicts a flowchart of an example process for Braille data entry using continuous contact virtual keyboard in accordance with an illustrative embodiment.

With reference to FIG. 6, this figure depicts a flowchart of an example process for Braille data entry using continuous contact virtual keyboard in accordance with an illustrative embodiment. Process 600 can be implemented in application 134 or 113 in FIG. 1.

The application presents a virtual Braille keyboard, such as virtual Braille keyboard 136 or 115 in FIG. 1 (block 602). The application senses a multi-touch gesture on the virtual Braille keyboard (block 604).

The application recognizes the Braille character represented by the multi-touch gesture at the virtual Braille keyboard (block 606). The application optionally provides audible or tactile feedback to the user about the recognition of the input (block 608). Such optional feedback may give the user an opportunity to correct an error in the gesture, or confirm that the application has correctly recognized the intended Braille character.

The application determines whether a home touch gesture has been applied (block 610). The determination of block 610 is regardless of a manner in which the home touch is applied. Preferably, to apply the home touch, the user touches the six Braille dot touch areas of the virtual Braille keyboard on the touchscreen.

If a home touch gesture has not been applied ("No" path of block 610), the application returns to block 604 and continues sensing the multi-touch gesture, such as for changes in the gesture as the user adjusts the gesture. If a home touch gesture has been applied ("Yes" path of block 610), the application registers the recognized Braille character (block 612). The application optionally provides audible or tactile feedback to the user about the registering or accepting of the input (block 614). Such optional feedback may give the user an indication to proceed to the next gesture for another input, or remove all touch points to end the input process.

The application determines whether all touch points have been removed from the virtual Braille keyboard (block 616). If at least some touch points remain, i.e., at least some contact is maintained with the virtual Braille keyboard ("No" block 616), the application returns to block 604 to recognize the next multi-touch gesture. If all touch points have been removed from the virtual Braille keyboard ("Yes" path of block 616), the application ends the input recognition process (block 618). The application optionally provides audible or tactile feedback to the user about the end of the process of registering or accepting of the input (block 620). Such optional feedback may provide the user a confirmation of the completion of the Braille input process. The application ends process 600 thereafter.

Thus, a computer implemented method, system or apparatus, and computer program product are provided in the illustrative embodiments for Braille data entry using continuous contact virtual keyboard. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
 displaying a virtual Braille keyboard with a set of six Braille dot touch points for inputting a Braille character and at least one other area for inputting one of a back-space, a line space, or a space character;

sensing a first touch gesture at a subset of the set of six Braille dot touch points at the virtual Braille keyboard, wherein the first touch gesture corresponds to a Braille character;

sensing a second touch gesture that concurrently touches each of the six Braille dot touch points in the set of Braille dot touch points, wherein a contact with a layout of the virtual Braille keyboard at a Braille dot touch point is continuously maintained while transitioning from the first touch gesture to the second touch gesture;

accepting, responsive to the second touch gesture, the Braille character;

providing a first tactile feedback indicating that the Braille character has been accepted;

sensing a third touch gesture at a second subset of the set of Braille dot touch points, the third touch gesture corresponding to a second Braille character, wherein a contact with at least one of the six Braille dot touch points is continuously maintained while transitioning from the second touch gesture to the third touch gesture;

registering, responsive to the third touch gesture at the additional touch area being followed by a fourth touch gesture that concurrently touches each of the six Braille dot touch points and a space character portion of the virtual Braille keyboard, the second Braille character, wherein a contact with at least one of the six Braille dot touch points is continuously maintained while transitioning from the third touch gesture to the fourth touch gesture;

ending accepting of Braille data entry input from the virtual Braille keyboard responsive to sensing that none of the six Braille dot touch points on the virtual Braille keyboard are being touched, and ignoring any remaining touches in other areas as long as all touches have been removed from the six Braille dot touch points to recognize the end of Braille data entry input; and providing a second tactile feedback indicating a confirmation that a Braille input process has ended.

2. The method of claim 1, further comprising:
registering, responsive to a fifth touch at the at least one other touch area being followed by a sixth touch gesture that concurrently touches each of the six Braille dot touch points, one of a back-space, a line space, or a space character.

3. The method of claim 1, further comprising:
shifting data entry focus to a second data entry field, to accept the Braille data entry input in the second data entry field.

4. A computer usable program product comprising a computer readable storage medium including computer usable code, the computer usable code comprising:
computer usable code for displaying a virtual Braille keyboard with a set of six Braille dot touch points for inputting a Braille character and at least one other area for inputting one of a back-space, a line space, or a space character;
computer usable code for sensing a first touch gesture at a subset of the set of six Braille dot touch points at the virtual Braille keyboard, wherein the first touch gesture corresponds to a Braille character;
computer usable code for sensing a second touch gesture that concurrently touches each of the six Braille dot touch points in the set of Braille dot touch points, wherein a contact with a layout of the virtual Braille keyboard at a Braille dot touch point is continuously maintained while transitioning from the first touch gesture to the second touch gesture;
computer usable code for accepting, responsive to the second touch gesture, the Braille character;
computer usable code for providing a first tactile feedback indicating that the Braille character has been accepted;
computer usable code for sensing a third touch gesture at a second subset of the set of Braille dot touch points, the third touch gesture corresponding to a second Braille character, wherein a contact with at least one of the six Braille dot touch points is continuously maintained while transitioning from the second touch gesture to the third touch gesture;
computer usable code for registering, responsive to the third touch gesture at the additional touch area being followed by a fourth touch gesture that concurrently touches each of the six Braille dot touch points and a space character portion of the virtual Braille keyboard, the second Braille character, wherein a contact with at least one of the six Braille dot touch points is continuously maintained while transitioning from the third touch gesture to the fourth touch gesture;
computer usable code for ending accepting of Braille data entry input from the virtual Braille keyboard responsive to sensing that none of the six Braille dot touch points on the virtual Braille keyboard are being touched, and ignoring any remaining touches in other areas as long as all touches have been removed from the six Braille dot touch points to recognize the end of Braille data entry input; and
computer usable code for providing a second tactile feedback indicating a confirmation that a Braille input process has ended.

5. The computer usable program product of claim 4, further comprising:
computer usable code for registering, responsive to a fifth touch at the at least one other touch area being followed by a sixth touch gesture that concurrently touches each of the six Braille dot touch points, one of a back-space, a line space, or a space character.

6. The computer usable program product of claim 4, further comprising:
computer usable code for shifting data entry focus to a second data entry field, to accept the Braille data entry input in the second data entry field.

7. The computer usable program product of claim 4, wherein the computer usable code is stored in a computer readable storage device in a data processing system, and wherein the computer usable code is transferred over a network from a remote data processing system.

8. The computer usable program product of claim 4, wherein the computer usable code is stored in a computer readable storage device in a server data processing system, and wherein the computer usable code is downloaded over a network to a remote data processing system for use in a computer readable storage device associated with the remote data processing system.

9. A data processing system comprising:
a storage device, wherein the storage device stores computer usable program code; and
a processor, wherein the processor executes the computer usable program code, and wherein the computer usable program code comprises:
computer usable code for displaying a virtual Braille keyboard with a set of six Braille dot touch points for inputting a Braille character and at least one other area for inputting one of a back-space, a line space, or a space character;

computer usable code for sensing a first touch gesture at a subset of the set of six Braille dot touch points at the virtual Braille keyboard, wherein the first touch gesture corresponds to a Braille character;

computer usable code for sensing a second touch gesture that concurrently touches each of the six Braille dot touch points in the set of Braille dot touch points, wherein a contact with a layout of the virtual Braille keyboard at a Braille dot touch point is continuously maintained while transitioning from the first touch gesture to the second touch gesture;

computer usable code for accepting, responsive to the second touch gesture, the Braille character;

computer usable code for providing a first tactile feedback indicating that the Braille character has been accepted;

computer usable code for sensing a third touch gesture at a second subset of the set of Braille dot touch points, the third touch gesture corresponding to a second Braille character, wherein a contact with at least one of the six Braille dot touch points is continuously maintained while transitions from the second touch gesture to the third touch gesture;

computer usable code for registering, responsive to the third touch gesture at the additional touch area being followed by a fourth touch gesture that concurrently touches each of the six Braille dot touch points and a space character portion of the virtual Braille keyboard, the second Braille character, wherein a contact with at least one of the six Braille dot touch points is continuously maintained while transitioning from the third touch gesture to the fourth touch gesture;

computer usable code for ending accepting of Braille data entry input from the virtual Braille keyboard responsive to sensing that none of the six Braille dot touch points on the virtual Braille keyboard are being touched, and ignoring any remaining touches in other areas as long as all touches have been removed from the six Braille dot touch points to recognize the end of Braille data entry input; and computer usable code for providing a second tactile feedback indicating a confirmation that a Braille input process has ended.

10. The data processing system of claim 9, further comprising:

computer usable code for registering, responsive to a fifth touch at the at least one other touch area being followed by a sixth touch gesture that concurrently touches each of the six Braille dot touch points, one of a back-space, a line space, or a space character.

11. The data processing system of claim 9, further comprising:

computer usable code for shifting data entry focus to a second data entry field, to accept the Braille data entry input in the second data entry field.

\* \* \* \* \*